(12) United States Patent
Ban et al.

(10) Patent No.: US 8,799,397 B2
(45) Date of Patent: Aug. 5, 2014

(54) SHARED TRANSPORT

(75) Inventors: Bela Ban, Kreuzlingen (CH); Vladimir Blagojevic, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 1029 days.

(21) Appl. No.: 12/154,618

(22) Filed: May 22, 2008

(65) Prior Publication Data

US 2009/0290586 A1    Nov. 26, 2009

(51) Int. Cl.
 *G06F 15/167* (2006.01)

(52) U.S. Cl.
 USPC .......................................... 709/213; 370/464

(58) Field of Classification Search
 USPC .......................................... 370/464; 709/213
 See application file for complete search history.

(56) References Cited

U.S. PATENT DOCUMENTS

| | | | |
|---|---|---|---|
| 6,542,920 B1 * | 4/2003 | Belkin et al. | 718/104 |
| 6,678,283 B1 * | 1/2004 | Teplitsky | 370/463 |
| 7,043,357 B1 * | 5/2006 | Stankoulov et al. | 701/200 |
| 2005/0157742 A1 * | 7/2005 | Chen et al. | 370/432 |
| 2006/0155735 A1 * | 7/2006 | Traut et al. | 707/101 |

OTHER PUBLICATIONS

Wikipedia. User Datagram Protocol. May 28, 2008. <http://web.archive.org/web/20080528040226/http://en.wikipedia.org/wiki/User_Datagram_Protocol>.*

* cited by examiner

*Primary Examiner* — Hassan Kizou
*Assistant Examiner* — Ashil Farahmand
(74) *Attorney, Agent, or Firm* — Lowenstein Sandler LLP (57) ABSTRACT

A method and apparatus for processing message is described. In one embodiment, messages are received over a plurality of channels from a plurality of applications in a virtual machine. An identifier is coupled to each message. The identifier refers to the application originating the corresponding message. A shared transport is formed and associated with the channels. The messages are processed with the shared transport with the identifier.

15 Claims, 5 Drawing Sheets

SHARED TRANSPORT

TECHNICAL FIELD

Embodiments of the present invention relate to group communication, and more specifically to parallel processing of messages.

BACKGROUND

Group communication protocol designed for multicast communication may be used to communicate messages between endpoints forming a group. Communication endpoints can be processes or objects, or any entity that can send and receive messages to/from a group.

Messages from different senders are conventionally processed in a First In First Out (FIFO) order in a single queue for incoming messages by one thread. The messages are processed sequentially in the order they are received. A bottleneck may thus be formed since every message has to wait for its turn to be processed accordingly.

One solution is to use a multiplexer to run multiple building blocks over the same channel thereby reducing the number of channels and threads, and thus minimizing memory consumption. However, the use of a multiplexer requires different semantics for each channel.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for processing messages. In one embodiment, messages are received over a plurality of channels from a plurality of applications in a virtual machine. An identifier is coupled to each message. The identifier refers to the application originating the corresponding message. A shared transport is formed and associated with the channels. The messages are processed with the shared transport with the identifier.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Network Communication Architecture

Figure 1:
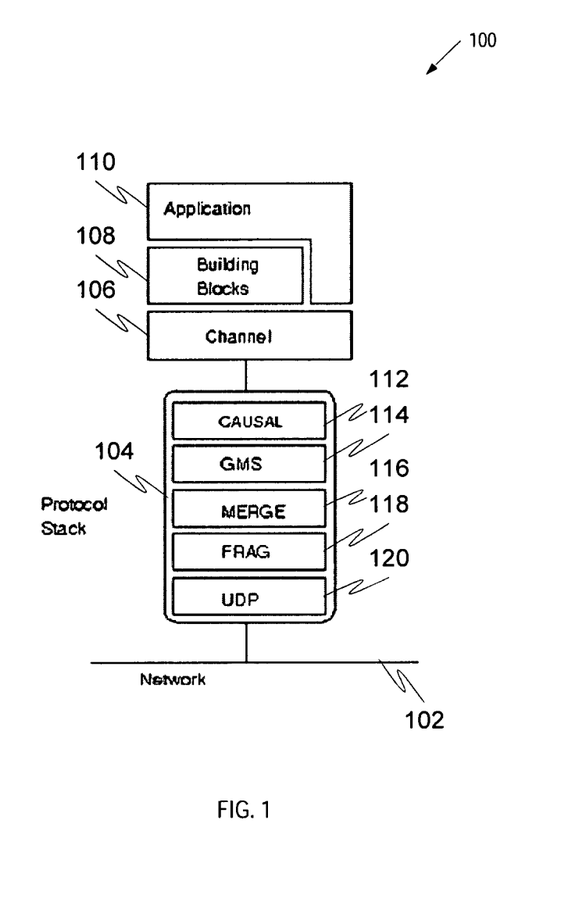
FIG. 1 illustrates a network architecture of a group communication in which embodiments of the present invention may be implemented.

FIG. 1 illustrates an exemplary network architecture of a group communication 100 in which embodiments of the present invention may operate. Processes can join a group, send messages to all members or single members and receive messages from members in the group. The system keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same LAN, or across a WAN. A member can be part of multiple groups.

The group communication architecture may comprise three parts: (1) a channel layer 106 used by application programmers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 comprising several protocols 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 consumes it.

When an application 110 connects to a channel 106, protocol stack 104 will be started, and when it disconnects protocol stack 104 will be stopped. When the channel 106 is closed, the stack 104 will be destroyed, releasing its resources.

Channel

To join a group and send messages, a process has to create a channel and connect to it using the group name (all channels with the same name form a group). The channel is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. Channels always know who the other members are in the same group: a list of member addresses can be retrieved from any channel. This list is called a view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

Channels may be similar to BSD sockets: messages are stored in a channel until a client removes the next one (pull-principle). When no message is currently available, a client is blocked until the next available message has been received.

A channel may be implemented over a number of alternatives for group transport. Therefore, a channel is an abstract class, and concrete implementations are derived from it, e.g. a channel implementation using its own protocol stack, or others using existing group transports. Applications only deal with the abstract channel class, and the actual implementation can be chosen at startup time.

The properties for a channel may be specified in a colon-delimited string format. When creating a channel, a protocol stack will be created according to these properties. All messages will pass through this stack, ensuring the quality of service specified by the properties string for a given channel.

Building Blocks

Channels are simple and primitive. They offer the bare functionality of group communication, and have been designed after the simple model of BSD sockets, which are widely used and well understood. The reason is that an application can make use of just this small subset, without having to include a whole set of sophisticated classes, that it may not even need. Also, a somewhat minimalistic interface is simple to understand: a client needs to know about 12 methods to be able to create and use a channel (and oftentimes will only use 3-4 methods frequently).

Channels provide asynchronous message sending/reception, somewhat similar to UDP. A message sent is essentially put on the network and the send( ) method will return immediately. Conceptual requests, or responses to previous requests, are received in undefined order, and the application has to take care of matching responses with requests.

Also, an application can retrieve messages from a channel (pull-style). Also channels offer push-style message reception. Pull-style message reception often needs another thread of execution, or some form of event-loop, in which a channel is periodically polled for messages.

The presently described group architecture offers building blocks that provide more sophisticated APIs on top of a Channel. Building blocks either create and use channels internally, or require an existing channel to be specified when creating a building block. Applications communicate directly with the building block, rather than the channel. Building blocks are intended to save the application programmer from having to write tedious and recurring code, e.g. request-response correlation.

Protocol Stack

Protocol stack 104 as illustrated in FIG. 1 includes the following protocols: CAUSAL 112, GMS 114, MERGE 116, FRAG 118, UDP 120. All messages sent and received over the channel have to pass through the protocol stack. Every layer may modify, reorder, pass or drop a message, or add a header to a message. A fragmentation layer might break up a message into several smaller messages, adding a header with an id to each fragment, and re-assemble the fragments on the receiver's side.

The composition of the protocol stack, i.e. its layers, is determined by the creator of the channel: a property string defines the layers to be used (and the parameters for each layer). This string might be interpreted differently by each channel implementation. It is used to create the stack, depending on the protocol names given in the property.

Knowledge about the protocol stack is not necessary when only using channels in an application. However, when an application wishes to ignore the default properties for a protocol stack, and configure their own stack, then knowledge about what the individual layers are supposed to do is needed. Although it is syntactically possible to stack any layer on top of each other (they all have the same interface), this wouldn't make sense semantically in most cases.

Message

Figure 2:
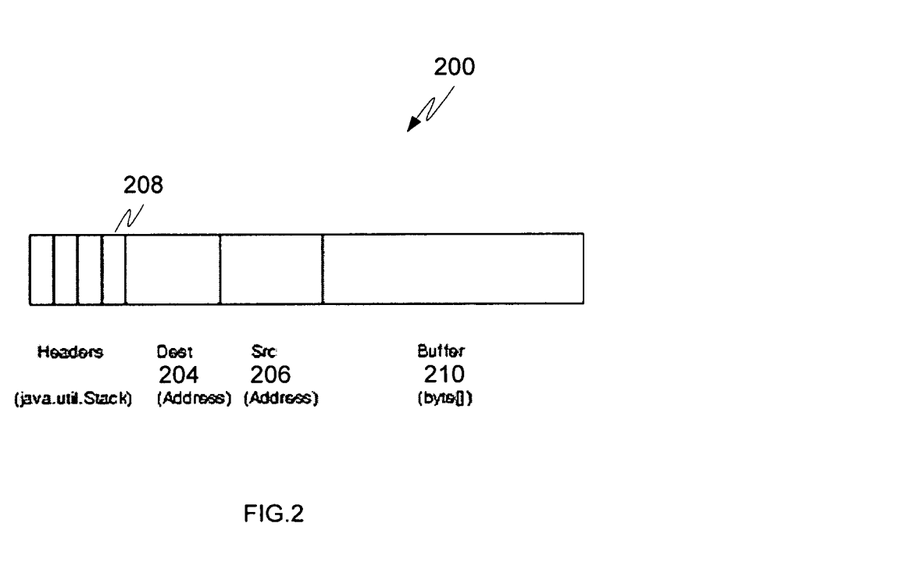
FIG. 2 illustrates a block diagram of one embodiment of a structure of a message.

Data is sent between members in the form of messages. A message can be sent by a member to a single member, or to all members of the group of which the channel is an endpoint. An example of a structure of a message 200 is illustrated in FIG. 2.

The message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader( ), and removeHeader( ) of message 200 can be used to manipulate headers 202.

The destination address 204 may include the address of the receiver. If null, the message will be sent to all current group members.

The source address 206 may include the address of a sender. It can be left null, and will be filled in by the transport protocol (e.g. UDP) before the message is put on the network 102.

One byte of the message 200 may be used for flags 208. An example of a flag may be OOB.

The payload 210 may include the actual data (as a byte buffer). The message class contains convenience methods to set a serializable object and to retrieve it again, using serialization to convert the object to/from a byte buffer.

The message 200 may be similar to an IP packet and consists of the payload (a byte buffer) and the addresses of the sender and receiver (as addresses). Any message put on the network 102 can be routed to its destination (receiver address), and replies can be returned to the sender's address.

A message usually does not need to fill in the sender's address when sending a message; this is done automatically by the protocol stack before a message is put on the network. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members would look like this:

Message msg=new Message(null, null, "Hello".getBytes( ));
  channel.send(msg);

Shared Transport

Figure 3:
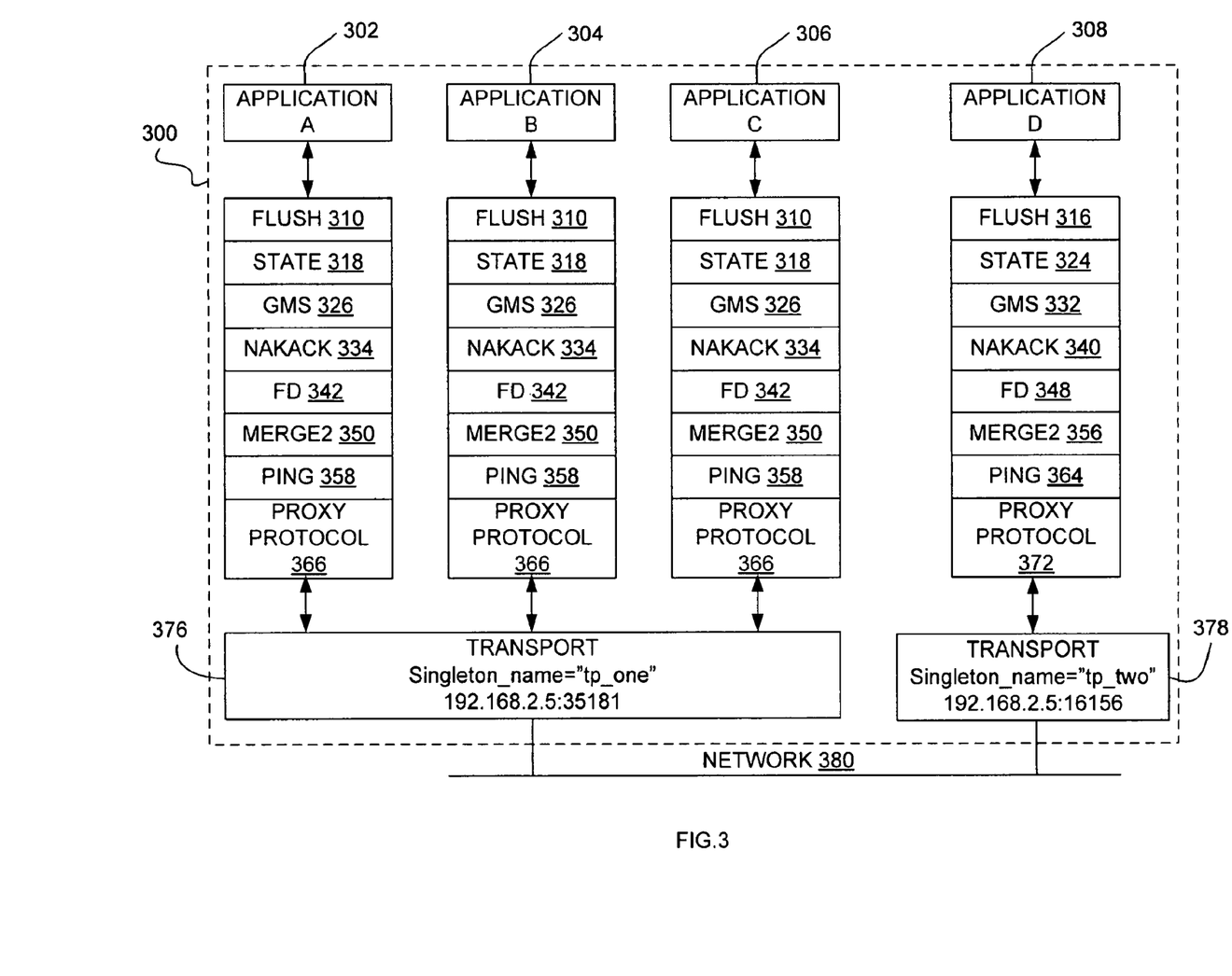
FIG. 3 illustrates a block diagram of one embodiment of a network architecture for a shared transport protocol.

FIG. 3 illustrates one embodiment of how channels can share one or more transports inside a virtual machine 300. To save resources (threads, sockets and CPU cycles), transports of channels residing within the same virtual machine (e.g. Java Virtual Machine) can be shared. If there are 4 channels inside the virtual machine, then there are 4 separate thread pools and sockets (1 per transport, and there are 4 transports (1 per channel)).

If those transports happen to be the same (all 4 channels use UDP, for example), then only 1 shared instance of UDP is created. That transport instance is created and started only once when the first channel is created, and is deleted when the last channel is closed.

Each channel created over a shared transport has to join a different cluster. An exception will be thrown if a channel sharing a transport tries to connect to a cluster to which another channel over the same transport is already connected.

When there are three channels (C1 connected to "cluster-1", C2 connected to "cluster-2" and C3 connected to "cluster-3") sending messages over the same shared transport, the cluster name with which the channel connected is used to multiplex messages over the shared transport: a header with the cluster name ("cluster-1") is added when C1 sends a message.

When a message with a header of "cluster-1" is received by the shared transport, it is used to demultiplex the message and dispatch it to the right channel (C1 in this example) for processing.

FIG. 3 illustrates 4 channels (Application A 302, Application B 304, Application C 306, Application D 308) sharing two transports 376, 378. The first three channels sharing transport "tp_one" 376 have the same protocols (FLUSH 310, STATE 318, GMS 326, NAKACK 334, FD 342, MERGE2 350, PING 358, PROXY PROTOCOL 366) on top of the shared transport. This is not required; the protocols above "tp_one" could be different for each of the 3 channels as long as all applications residing on the same shared transport have the same requirements for the transport's configuration. The last channel with application D 308 includes its own transport 378 and does not share any transport.

To use shared transports, a property "singleton_name" is added to the transport configuration of transport 376, 378. All channels with the same singleton name share the same transport.

FLUSH 310 protocol is used to flush out old messages before installing a new view. STATE 318 ensures that state is correctly transferred from an existing member (usually the coordinator) to a new member. GMS 326 is a membership protocol that is responsible for joining/leaving members and installing new views. NAKACK 334 is a protocol that ensures (a) message reliability and (b) FIFO. Message reliability guarantees that a message will be received. If not, the receiver(s) will request retransmission. FIFO guarantees that all messages from sender P will be received in the order P sent them. FD 342 is a protocol for failure detection based on heartbeats and are-you-alive messages (in a ring form between members). It generates notification if a member fails. MERGE2 350 is a protocol for merging subgroups back into one group. It kicks in after a cluster partition. PING 358 is a protocol that uses IP multicast (by default) to find initial members. Once found, the current coordinator can be determined and a unicast JOIN request will be sent to it in order to join the cluster. PROXY PROTOCOL 366 is a protocol that adds an identifier to the message and identifies the application originating the message and the transport 376. In one embodiment, a property "singleton_name" is added to the transport configuration of transport 376, 378. All channels with the same singleton name share the same transport.

Figure 4:
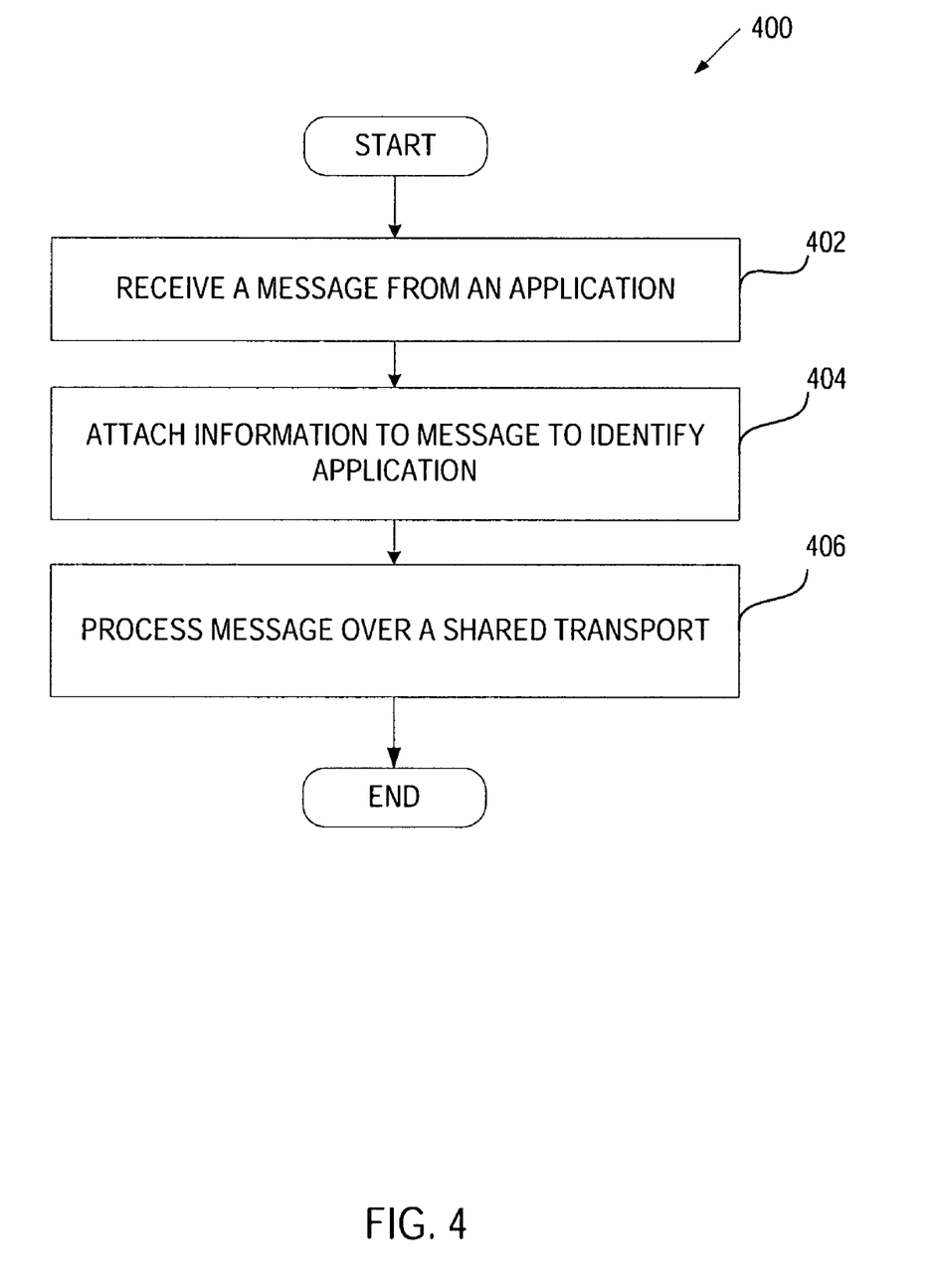
FIG. 4 illustrates a flow diagram of one embodiment of a method for processing messages.

FIG. 4 illustrates a flow diagram of a method for processing messages. At 402, a message is received from an application over a corresponding channel in a virtual machine. At 404, an identifier is attached to the message to refer to the application originating the corresponding message. At 406, the shared transport associated with one or more channels processes the message with the identifier. In one embodiment, messages are multiplexed on the shared transport. The messages are also sent over the shared transport. In one embodiment, the identifier is stored in the header of each message. The shared transport is configured to include a transport sharing property to identify the shared transport.

In another embodiment, the shared transport includes a transport protocol for sending and receiving messages to and from a network coupled to the virtual machine. The shared transport protocol enables to share a default thread pool and an out of bound thread pool. The thread pools send the messages up the transport protocol stack to a corresponding channel of a channel layer, a building block layered on top of the channel layer, and an application programming interface layered on top of the building block.

Computer System

Figure 5:
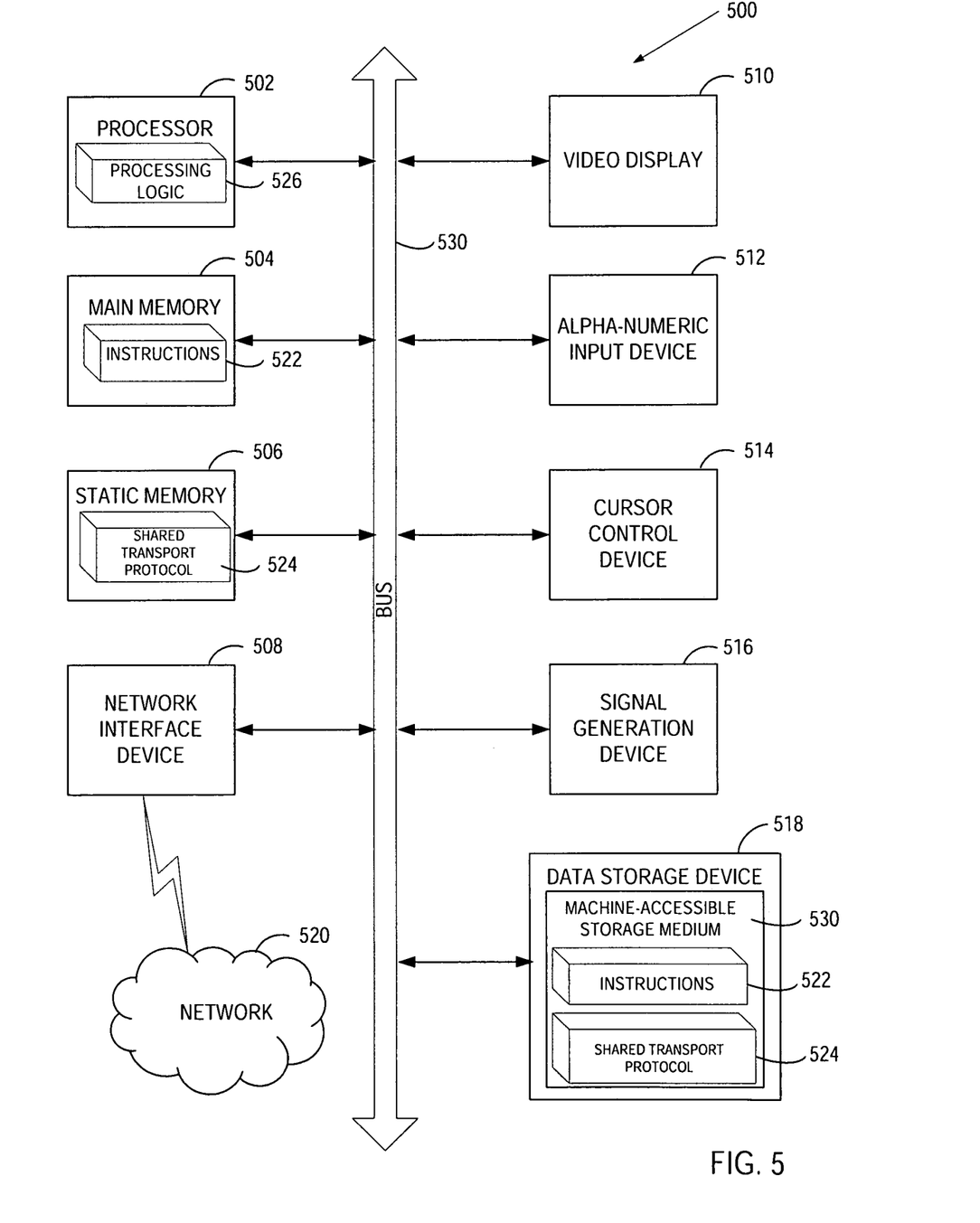
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store shared transport protocol configurations 524. Shared transport protocol configurations 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   creating, by a processing device executing a virtual machine (VM), a first channel for a first application executed by the virtual machine, wherein the first channel is identified by a name of a group to which the first application is a member, the first channel providing communications for the first application to all members of the group;
   creating, by the processing device, a second channel for a second application executed by the virtual machine, wherein the second channel is identified by a name of another group to which the second application is a member, the second channel providing communications for the second application to all members of the another group;
   when a protocol of a transport layer of a protocol stack of each of the first channel and the second channel is the same, sharing, by the processing device, resources to implement a shared transport layer between the first channel and the second channel, wherein the shared resources comprise a default thread pool, an out of bound thread pool, and a timer thread pool, and wherein other protocol layers of the first and second channels operate independently of each other except for the shared transport layer;
   receiving, by the processing device, a message from a member application through a network interface device connected to a network; and
   multiplexing, by the processing device, the received message over the shared transport layer to the first application or the second application via the first or second channel in view of a group name identifier located in the received message corresponding to the name of one of the groups to which the first or the second application belongs.

2. The method of claim 1 wherein the multiplexing the message further comprises:
   multiplexing the messages on the shared transport; and
   sending the messages over the shared transport.

3. The method of claim 1 wherein the group name identifier is stored in the header of each of the messages.

4. The method of claim 1 wherein the shared transport layer comprises a transport protocol for sending and receiving messages to and from a network coupled to the VM.

5. The method of claim 4 wherein the thread pools send the messages using the transport protocol to each of a protocol layer of a corresponding channel, a building block layered on top of the corresponding channel, and an application programming interface layered on top of the building block.

6. A non-transitory computer-readable medium comprising instructions to cause a processing device to perform operations comprising:
creating, by the processing device executing a virtual machine (VM), a first channel for a first application executed by the virtual machine, wherein the first channel is identified by a name of a group to which the first application is a member, the first channel providing communications for the first application to all members of the group;
creating, by the processing device, a second channel for a second application executed by the virtual machine, wherein the second channel is identified by a name of another group to which the second application is a member, the second channel providing communications for the second application to all members of the another group;
when a protocol of a transport layer of a protocol stack of each of the first channel and the second channel is the same, sharing, by the processing device, resources to implement a shared transport layer between the first channel and the second channel, wherein the shared resources comprise a default thread pool, an out of bound thread pool, and a timer thread pool, and wherein other protocol layers of the first and second channels operate independently of each other except for the shared transport layer;
receiving, by the processing device, a message from a member application through a network interface device connected to a network; and
multiplexing, by the processing device, the received message over the shared transport layer to the first application or the second application via the first or second channel in view of a group name identifier located in the received message corresponding to the name of one of the groups to which the first or the second application belongs.

7. The non-transitory computer-readable medium of claim 6 wherein the multiplexing the messages further comprises: multiplexing the messages on the shared transport; and sending the messages over the shared transport.

8. The non-transitory computer-readable medium of claim 6 wherein the group name identifier is stored in the header of each of the messages.

9. The non-transitory computer-readable medium of claim 6 wherein the shared transport layer comprises a transport protocol for sending and receiving messages to and from a network coupled to the VM.

10. The non-transitory computer-readable medium of claim 9 wherein the thread pools send the messages using the transport protocol to each of a protocol layer of a corresponding channel, a building block layered on top of the corresponding channel, and an application programming interface layered on top of the building block.

11. An apparatus comprising:
a processing device executing a virtual machine (VM);
a memory storing executable software, when executed by the processing device, is to send and receive messages;
a network interface device connected to a network,
wherein the processing device is to:
create a first channel for a first application executed by the virtual machine, wherein the first channel is identified by a name of a group to which the first application is a member, the first channel providing communications for the first application to all members of the group;
create a second channel for a second application executed by the virtual machine, wherein the second channel is identified by a name of another group to which the second application is a member, the second channel providing communications for the second application to all members of the another group;
when a protocol of a transport layer of a protocol stack of each of the first channel and the second channel is the same, share resources to implement a shared transport layer between the first channel and the second channel, wherein the shared resources comprise a default thread pool, an out of bound thread pool, and a timer thread pool, and wherein other protocol layers of the first and second channels operate independently of each other except for the shared transport layer;
receive a message from a member application through the network interface device connected to the network; and
multiplexing, by the processing device, the received message over the shared transport layer to the first application or the second application via the first or second channel in view of a group name identifier located in the received message corresponding to the name of one of the groups to which the first or the second application belongs.

12. The apparatus of claim 11, wherein the processing device is further to send the messages over the shared transport layer.

13. The apparatus of claim 11 wherein the group name identifier is stored in the header of each of the messages.

14. The apparatus of claim 11 wherein the shared transport layer comprises a transport protocol for sending and receiving messages to and from a network coupled to the VM.

15. The apparatus of claim 14 wherein the thread pools send the messages using the transport protocol to each of a protocol layer of a corresponding channel, a building block layered on top of the corresponding channel, and an application programming interface layered on top of the building block.

* * * * *